United States Patent [19]

Kano et al.

[11] Patent Number: 4,800,112

[45] Date of Patent: Jan. 24, 1989

[54] OPTICAL RECORDING MEDIUM

[75] Inventors: Nobuhiko Kano; Akira Aoyama; Shinobu Kunida, all of Nagano, Japan

[73] Assignee: Seiko Epson Corporation, Tokyo, Japan

[21] Appl. No.: 36,240

[22] Filed: Apr. 9, 1987

[30] Foreign Application Priority Data

Apr. 10, 1986 [JP] Japan .................................. 61-83010
May 28, 1986 [JP] Japan ................................ 61-122767

[51] Int. Cl.$^4$ ............................................... G11B 7/24
[52] U.S. Cl. ..................................... 428/163; 428/167;
428/336; 428/412; 428/469; 428/480; 428/500;
428/522; 428/692; 428/694; 428/698; 428/704;
428/900
[58] Field of Search ............... 428/163, 167, 336, 412,
428/457, 469, 472, 480, 704, 500, 900, 522, 692,
694, 698; 365/122; 369/13, 288; 360/131, 134

[56] References Cited

U.S. PATENT DOCUMENTS 4,449,138  5/1984  Ando .............................. 346/76 L
4,450,553  5/1984  Holster et al. ...................... 369/94

FOREIGN PATENT DOCUMENTS

0161807  11/1985  European Pat. Off. .

Primary Examiner—George F. Lesmes
Assistant Examiner—James B. Monroe
Attorney, Agent, or Firm—Blum Kaplan

[57] ABSTRACT

An optical recording medium having two adhered substrates one of which has a magneto-optic recording layer thereon and the other of which has at least one dielectric layer thereon so as to improve stability and weatherability. The dielectric layer is a transparent oxide, a nitride or a mixture of an oxide and a nitride and has a thickness between about 30Å and 10 μm. In an especially preferred embodiment, neither substrate is provided with any layers in either the internal area or the circumferential area of a disk and the substrates themselves are exposed and adhered together with adhesive.

18 Claims, 9 Drawing Sheets

OPTICAL RECORDING MEDIUM

BACKGROUND OF THE INVENTION

This invention relates to optical recording media having layered structures and, in particular, to layered optical recording media having improved stability and weatherability.

Optical recording media that permit reading, writing and erasing are of recent interest. In particular, magneto-optic recording media utilizing the magneto-optic effect have recently been put into practical use as erasable-rewritable optical recording media. One of the problems that has been encountered with such media is that the magneto-optic recording layers often have inferior durability because they contain rare earth transition metals. It is for this reason that the recording layer is generally sandwiched with transparent dielectric layers prior to adhesion of the opposing substrates.

Figure 1:
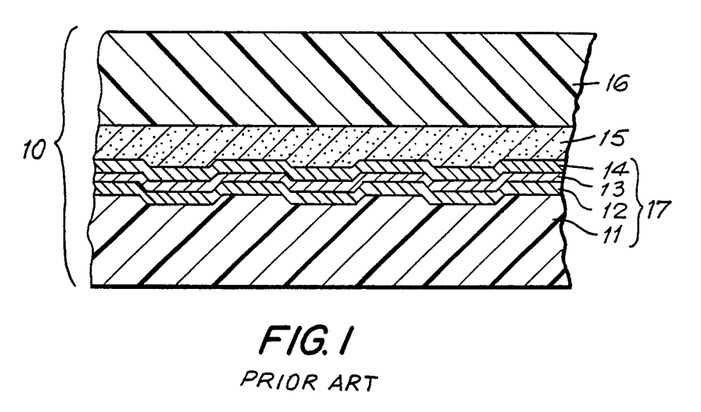
FIG. 1 is a cross-sectional view of a prior art recording medium.

A conventional magneto-optic recording medium 10 in which the substrates are adhered together is shown in FIG. 1. A polycarbonate substrate 11 having a thickness up to about 1.2 mm is formed with grooves having a groove pitch of up to about 1.6 μm, a groove width of up to about 0.8 μm and a groove depth of up to about 700 Å on one surface. A silicon nitride dielectric layer 12 having a thickness up to about 1000 Å is formed on the grooved side of grooved polycarbonate substrate 11 and a magneto-optic recording layer 13 having a thickness up to about 450 Å is formed on silicon nitride layer 12. The magneto-optic recording layer can be, for example, terbium-iron-cobalt (TbFeCo) or neodymium-dysprosium-iron-cobalt (NdDyFeCo). A silicon nitride dielectric layer 14 having a thickness up to about 1000 Å is formed on magneto-optic recording layer 13. Substrate 11, dielectric layer 12, magneto-optic recording layer 13 and dielectric layer 14 together form an optical transmission substrate 17. A smooth polycarbonate substrate 16 is disposed on and secured to dielectric layer 14 of optical transmission substrate 17 by an ultraviolet (UV) curing resin layer 15.

One of the problems that arises with this type of recording medium is that gas bubbles are mixed with the UV curing resin layer when the substrates are adhered under vacuum. It is believed that these bubbles result from evaporation of a volatile substance contained in the substrate. Bubbles in the adhesive layer prevent the reading and writing of correct information from or to the recording layer because the bubbles cause the dielectric layer to crack. This causes deterioration in the bit error rate.

Furthermore, after joining the substrates together, the internal and circumferential areas of the recording medium, which is generally in the form of a disk, are exposed. When an accelerated aging test is conducted at a temperature of 60° C. and 90% relative humidity, deterioration of the recording layer from the internal and circumferential areas occurs within about 100 hours since the adhesive forces generated by the ultraviolet curing adhesive are weak. This causes the adhesive interface to peel when the adhered substrates are tested for aging in a high temperature, high humidity chamber. Additionally, the adhesive interface deteriorates when the adhesive is removed from either the circumferential or internal area of a disk by mechanical processes.

Accordingly, it is desirable to provide a recording medium having improved adhesion between the substrates.

SUMMARY OF THE INVENTION

Generally speaking, in accordance with the invention, an optical recording medium having two combined substrates one of which has a magneto-optic recording layer thereon and the other without a recording layer has at least one dielectric layer thereon so as to improve stability and weatherability is provided. The dielectric layer is a transparent oxide, a nitride or a mixture of an oxide and a nitride and has a thickness between about 30 Å and 10 μm. In a preferred embodiment, neither substrate is provided with any layers in either the internal area or the circumferential area of a disk and the substrates themselves are exposed and adhered together with adhesive.

Accordingly, it is an object of the invention to provide a recording medium wherein air bubbles are eliminated from the adhesive used to adhere the substrates.

Another object of the invention is to provide an optical recording medium having an improved bit error rate.

A further object of the invention is to provide a recording medium having improved adhesion at the interface in the internal and circumferential area of a disk.

Yet another object of the invention is to provide a structure for a recording medium wherein the recording layer withstands durability testing for up to 5000 hours.

Still other objects and advantages of the invention will in part be obvious and will in part be apparent from the specification.

The invention accordingly comprises a product possessing the features, properties, and the relation of components which will be exemplified in the product hereinafter described, and the scope of the invention will be indicated in the claims.

DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

The recording medium constructed in accordance with the invention is prepared by adhering two substrates together. At least one of the substrates includes a base that has a recording layer provided thereon for storing information. Information can be read, written onto, or erased from the recording layer. The other substrate includes a base that is provided with at least one dielectric layer. An adhesive is used to adhere the substrates together in such a way that the bases are distal from the adhesive on opposite sides thereof.

The dielectric layer is transparent and is preferably an oxide, fluoride, sulfide or nitride. Preferably, the dielectric layer is at least one of $Al_2O_3$, $Bi_2O_3$, CaO, CdO, CdS, $CeO_2$, $Cd_2O_3$, $In_2O_3$, $La_2O_3$, MgF, MgO, $Nd_2O_3$, $Sb_2O_3$, $SiO_2$, SiO, $SnO_2$, $TiO_2$, ZnO, $ZrO_2$, ZnS, AlN, $Si_3N_4$, SiN, TiN, BN, HfN and ZrN.

A recording medium prepared in accordance with the invention having only one magneto-optic recording layer is formed as follows. The recording medium includes a first optical transmission substrate including a first base and at least a magneto-optic recording layer disposed on a portion of the base. In a preferred embodiment of the invention a dielectric layer is first disposed on the base. A second optical transmission substrate for cooperating with the first substrate includes a second base and a dielectric layer disposed on the portion of the second substrate in the region overlapping the recording layer when assembled. An adhesive layer is provided between the first and second optical transmission substrates so that the bases are distal from the adhesive layer on its side of the adhesive layer.

The dielectric layer has a thickness between about 30 Å and 10 μm. It has been found that when the dielectric layer has a thickness of less than about 30 Å, it cannot be provided uniformly over the entire substrate and is actually scattered like islands on the substrate. When the dielectric layer has a thickness of greater than about 10 μm, a great deal of time is required to cover the substrate and accordingly, covering the substrate with such a thick dielectric layer cannot be accomplished economically.

The invention will now be explained with reference to the following examples wherein the structures of the recording media described are preferably disk structures. These examples are presented for purposes of illustration only and are not intended to be construed in a limiting sense.

EXAMPLE 1

Figure 2:
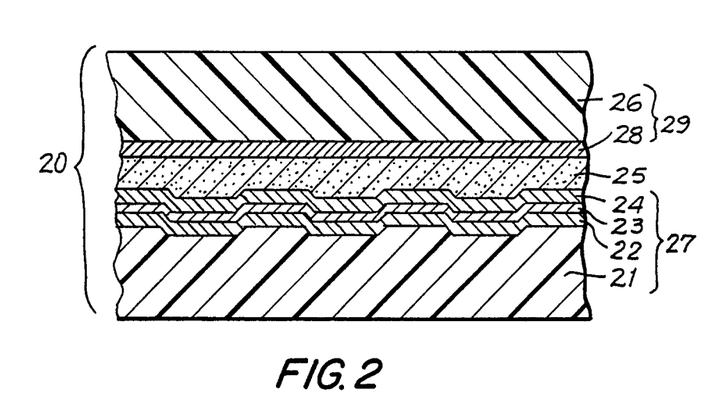
FIG. 2 is a cross-sectional view of a recording medium constructed and arranged in accordance with the invention.

An exemplary structure of a recording medium shown generally as 20 prepared in accordance with the invention is shown in FIG. 2. One side of a polycarbonate substrate 21 having a thickness of 1.2 mm was grooved to a groove pitch of 1.6 μm, a groove width of 0.8 μm and a groove depth of 650 Å. A silicon nitride dielectric layer 22 having a thickness of 1000 Å was deposited on the grooved side of substrate 21. A terbium-iron-cobalt (TbFeCo) magneto-optic recording layer 23 having a thickness of 450 Å was deposited on silicon nitride layer 22. Then a silicon nitride dielectric layer 24 having a thickness of 1000 Å was deposited on magneto-optic recording layer 23. Substrate 21, dielectric layer 22, magneto-optic recording layer 23 and dielectric layer 24 form a first optical transmission substrate 27.

A silicon nitride dielectric layer 28 having a thickness of 1000 Å was deposited on one side of a second polycarbonate substrate 26 having a thickness of 1.2 mm and no grooves. Substrate 26 and dielectric layer 28 form a second optical transmission substrate 29. First optical transmission substrate 27 and second optical transmission substrate 29 were joined with an adhesive layer 25 therebetween so that dielectric layer 24 and dielectric layer 28 were adjacent adhesive layer 25 on opposite sides thereof and polycarbonate substrates 21 and 26 were on the outside of recording medium 20. Adhesive layer 25 was an ultraviolet curing resin adhesive.

Suitable curing resin adhesives for use in preparing the recording medium of the invention generally include a photoinitiator and an acrylate monomer. A small amount of a sensitizing agent can also be used. The initiator is preferably used in an amount up to about 7% by weight and the acrylate monomer and oligomer are preferably used in an amount greater than about 90% by weight. The sensitizing agent is preferably used in an amount up to about 2% by weight.

An example of a suitable photoinitiator is IRGACURE 651, a product of Ciba-Geigy Ltd. Suitable acrylate monomers include, but are not limited to, hexanediol diacrylate (HDDA), trimethylol propane triacrylate (TMPTA), neopentylglycol diacrylate (NPGDA), tripropylenegycol diacrylate (TPGDA) and tetrahydrofurfuryl acrylate (THFA).

Some examples of curing resin adhesive formulations that have satisfactorily been used in recording media prepared in accordance with the invention include:

|  | FORM. 1 | FORM. 2 | FORM. 3 | FORM. 4 |
| --- | --- | --- | --- | --- |
| Initiator | IRGACURE 651 (4 Phr) | IRGACURE 651 (4 Phr) | IRGACURE 651 (4 Phr) | IRGACURE 651 (4 Phr) |
| Sensitizing Agent | — | — | TRIETHYL-AMINE (1 Phr) | — |
| Acrylate Monomer | HDDA (80 Phr) TMPTA (16 Phr) | HDDA (40 Phr) NPGDA (40 Phr) TMPTA (16 Phr) | HDDA (80 Phr) TMPTA (10 Phr) TPGDA (5 Phr) | THFA (80 Phr) TMPTA (16 Phr) |

The optimum thickness of the ultraviolet curing resin adhesive layer is between about 10 and 100 μm. The adhesive is cured using a high pressure mercury arc lamp of the type having a maximum intensity of 2 kilowatts and available from Berkey Technical Corp. The intensity of ultraviolet radiation is preferably about 80 mW/cm$^2$ and the period of irradiation is preferably about 10 seconds. The irradiation intensity can be measured using an M01-UV35 sensor produced by ORC Corp.

Figure 3:
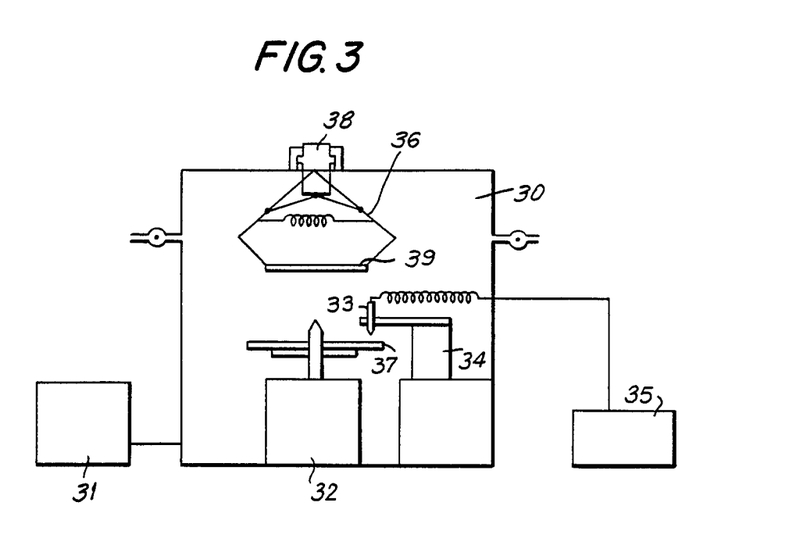
FIG. 3 is a schematic diagram of an adhering apparatus used to prepare recording media in accordance with the invention.

A schematic diagram of the apparatus used to prepare the recording medium described is shown in FIG. 3. A holding member 32 holds first optical transmission substrate 27 at position 37. Adhesive is dispensed onto the upper dielectric layer of first optical transmission substrate 27 under vacuum or in air by a dispensing nozzle 33 which moves in a horizontal direction and is controlled by a control unit 34. The source of dispensed adhesive is a dispenser unit 35 located outside of a vacuum chamber 30. The upper substrate having no recording layer, such as second optical transmission substrate 29, is held by a frame 36 with dielectric layer 28 facing downward as indicated at 39. A switch 38 controls the downward movement of second substrate 29 onto first substrate 27 under vacuum after adhesive is applied. Second optical transmission substrate 29 must be adhered to first optical transmission substrate 27 under vacuum irrespective of whether adhesive is applied to first substrate 27 under vacuum or in air. The entire process is conducted in vacuum chamber 30 which is evacuated by means of a vacuum pump 31 also located outside of chamber 30. Accordingly, the ultraviolet curing adhesive is applied to first substrate 27 under vacuum or in air and is then exposed to ultraviolet light to obtain the structure shown in FIG. 2.

Recording medium 20 shown in FIG. 2 provided by the apparatus shown in FIG. 3 had no bubbles mixed with adhesive layer 25 and a desirable bit error rate was obtained. In particular, burst error caused by a mixture of adhesive and bubbles was eliminated.

EXAMPLE 2

Figure 4:
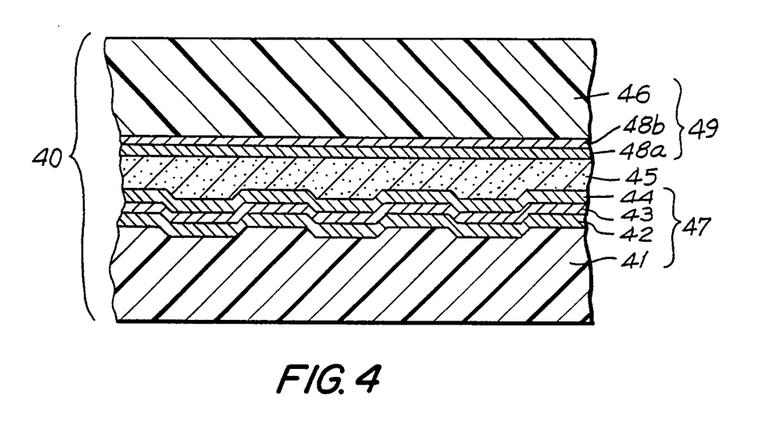
FIG. 4 is a cross-sectional view of a recording medium constructed and arranged in accordance with another embodiment of the invention.

FIG. 4 shows another structure shown generally as 40 prepared using the apparatus shown in FIG. 3. One side of a polymethylmethacrylate substrate or base 41 having a thickness of 1.2 mm was grooved to a groove pitch of 2.0 μm, a groove width of 0.8 μm and a groove depth of 700 Å. A silicon nitride dielectric layer 42 having a thickness of 1000 Å was provided on the grooved side of substrate 41. A neodymium-dysprosium-iron-cobalt (NdDyFeCo) magneto-optic recording layer 43 having a thickness of 470 Å was provided on dielectric layer 42. A second silicon nitride dielectric layer 44 having a thickness of 1000 Å was provided on magneto-optic recording layer 43. Substrate 41, dielectric layer 42, magneto-optic recording layer 43 and dielectric layer 44 form a first optical transmission substrate 47.

An aluminum nitride dielectric layer 48b having a thickness of 500 Å was deposited on one side of a smooth, ungrooved polymethylmethacrylate substrate or base 46 having a thickness of 1.2 mm. A silicon nitride dielectric layer 48a having a thickness of 500 Å was formed on aluminum nitride dielectric layer 48b. Substrate 46, dielectric layer 48b and dielectric layer 48a form a second optical transmission substrate 49. Substrates 47 and 49 were adhered to each other using ultraviolet curing adhesive 45 of the type described in Example 1 in such a way that adhesive 45 was between first and second optical transmission substrates 47 and 49 and dielectric layers 44 and 48a were adjacent opposite side of adhesive 45. Substrates 41 and 46 were on the outside of the structure.

This structure had no bubbles mixed with adhesive layer 45 and a desirable bit error rate was obtained. In addition, burst error caused by a mixture of bubbles with the adhesive was eliminated.

EXAMPLE 3

Figure 5:
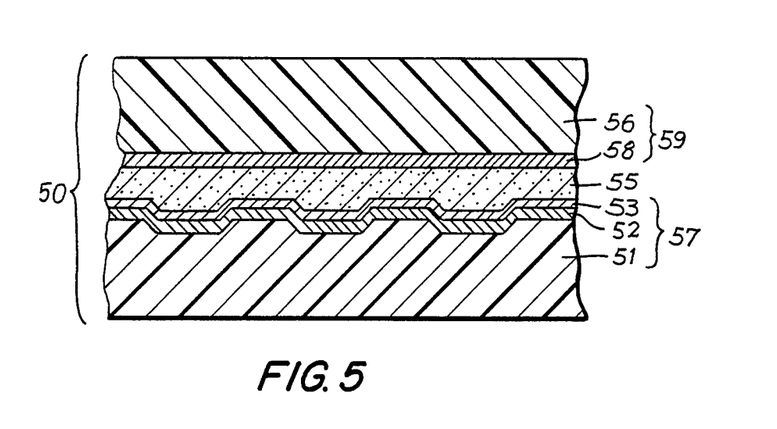
FIG. 5 is a cross-sectional view of a recording medium constructed and arranged in accordance with a further embodiment of the invention.

FIG. 5 shows another disk structure 50 prepared using the apparatus shown in FIG. 3. One side of a polycarbonate substrate 51 having a thickness of 1.2 mm was grooved to a groove pitch of 1.6 μm, a groove width of 0.8 μm and a groove depth of 650 Å. A silicon oxide (SiO) dielectric layer 52 having a thickness of 1000 Å was provided on the grooved side of substrate 51. A neodymium-dysprosium-iron-cobalt (NdDyFeCo) magneto-optic recording layer 53 having a thickness of 800 Å was provided on silicon oxide dielectric layer 52. Substrate 51, dielectric layer 52 and magneto-optic recording layer 53 form a first optical transmission substrate 57.

A smooth, ungrooved polycarbonate substrate 56 having a thickness of 1.2 mm was provided and a silicon oxide layer 58 having a thickness of 1000 Å was provided on one side thereof. Silicon oxide layer 58 and polycarbonate substrate 56 form a second optical transmission substrate 59. Substrates 57 and 59 were adhered together using an ultraviolet curing resin adhesive of the type described in Example 1 in such a way that magneto-optic recording layer 53 and silicon oxide dielectric layer 58 were adjacent adhesive 55 on opposite sides thereof and polycarbonate substrates 51 and 56 were on the outside of the structure.

No bubbles were mixed with adhesive layer 55 and a desirable bit error rate was obtained. In addition, burst error caused by a mixture of bubbles with the adhesive was eliminated.

EXAMPLE 4

Figure 6:
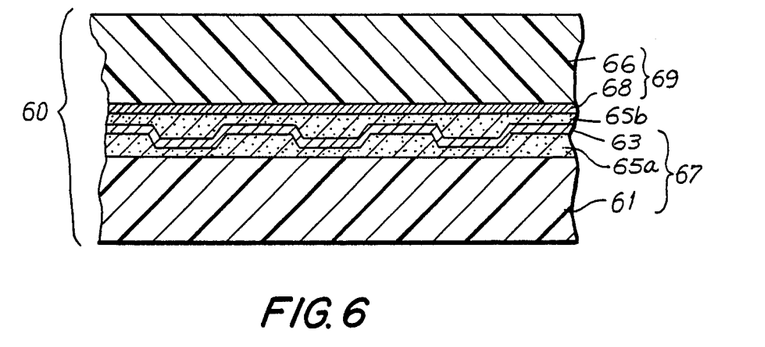
FIG. 6 is a cross-sectional view of a recording medium constructed and arranged in accordance with yet another embodiment of the invention.

FIG. 6 shows another structure 60 prepared by the adhering apparatus shown in FIG. 3. An ultraviolet curing resin layer 65a was provided on one side of a smooth polycarbonate substrate 61 having a thickness of 1.2 mm by a photopolymerization method, also referred to as a "2P method". Ultraviolet curing resin layer 65a had a thickness of 30 μm and U-shaped grooves with a groove pitch of 1.6 μm, a groove width of 0.8 μm and a groove depth of 700 Å. A neodymium-dysprosium-iron-cobalt (NdDyFeCo) magneto-optic recording layer 63 having a thickness of 700 Å was provided on ultraviolet curing resin layer 65a. Substrate 61, ultraviolet curing resin layer 65a and magneto-optic recording layer 63 form a first optical transmission substrate 67.

A silicon nitride dielectric layer 68 having a thickness of 1000 Å was provided on one side of a second smooth, ungrooved polycarbonate substrate 66 having a thickness of 1.2 mm. Substrate 66 and dielectric layer 68 form a second optical transmission substrate 69. Optical substrate 69 was adhered to optical substrate 67 through an ultraviolet curing adhesive 65b of the type described in Example 1 in such a way that magneto-optic recording layer 63 was adjacent one of adhesive 65b and dielectric layer 68 was adjacent the opposite side of adhesive 65b. Substrates 61 and 66 were on the outside of the structure.

No bubbles were mixed with the adhesive layer and a desirable bit error rate was obtained. In addition, the burst error rate caused by a mixture of bubbles with the adhesive was eliminated.

EXAMPLE 5

Figure 7:
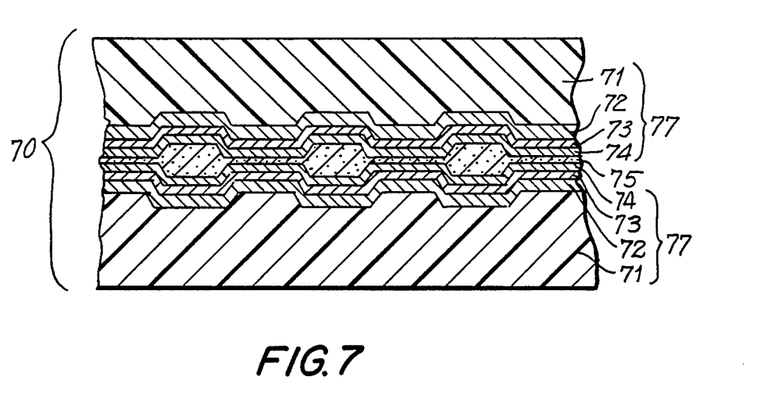
FIG. 7 is a cross-sectional view of a recording medium constructed and arranged in accordance with still another embodiment of the invention.

FIG. 7 shows yet another structure 70 prepared using the apparatus shown in FIG. 3. A silicon nitride dielectric layer 72 having a thickness of 1000 Å was provided on the grooved side of a polycarbonate substrate 71 having a thickness of 1.2 mm and grooves having a groove pitch of 1.6 μm, a groove width of 0.8 μm and a groove depth of 650 Å on one side thereof. A terbium-iron-cobalt (TbFeCo) magneto-optic recording layer 73 having a thickness of 450 Å was provided on silicon nitride dielectric layer 72. A second silicon nitride dielectric layer 74 having a thickness of 1000 Å was provided on magneto-optic recording layer 73. Substrate 71, dielectric layer 72, magneto-optic recording layer 73 and dielectric layer 74 form a first optical transmission substrate 77.

A second optical transmission substrate 77 having the identical structure was provided and the first and second optical transmission substrates 77 were adhered together with an ultraviolet curing resin adhesive 75 of the type described in Example 1 therebetween in such a way that dielectric layers 74 were adjacent to adhesive 75 on opposite sides thereof and polycarbonate substrates 71 were on the outside of the structure.

No bubbles were mixed with the adhesive layer and a desirable bit error ratio was obtained. In addition, burst error caused by a mixture of bubbles with adhesive was eliminated.

Figure 8A:
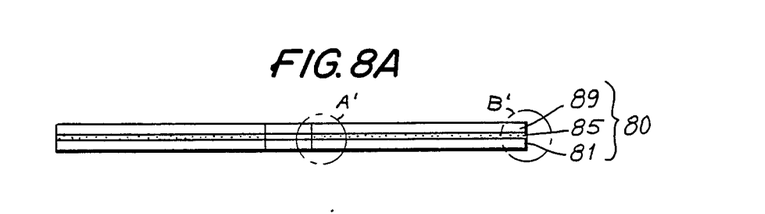
FIG. 8A is a cross-sectional view of an optical recording disk constructed and arranged in accordance with the invention.
Figure 8B:
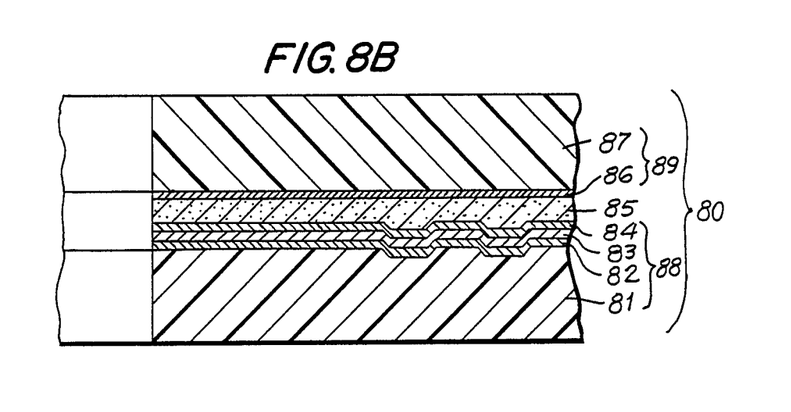
FIG. 8B is an exploded cross-sectional view of area A' of the disk of FIG. 8A.
Figure 8C:
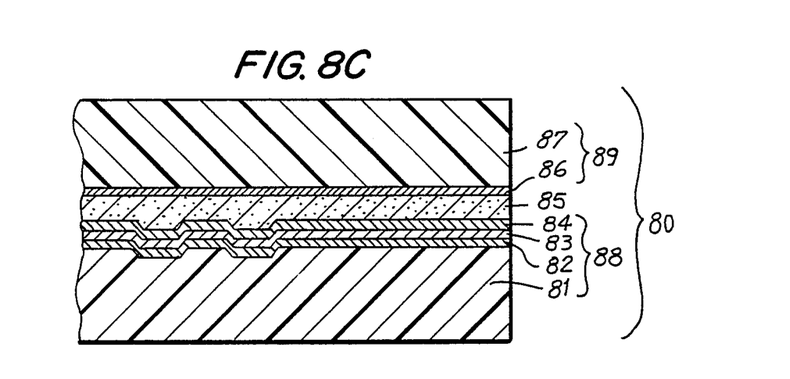
FIG. 8C is an exploded cross-sectional view of area B' of the disk of FIG. 8A.

It is to be understood that in the examples discussed hereinabove, all of the layers extend to the edges of each of the substrates. This can be seen more clearly in FIGS. 8A to 8C wherein a magneto-optic recording medium 80 having adhered substrates is shown. As shown in FIGS. 8A to 8C wherein FIG. 8B is an exploded view of area A' of FIG. 8A and FIG. 8C is an exploded view of area B' of FIG. 8A, a polycarbonate substrate 81 having a thickness of up to about 1.2 mm is grooved to a groove pitch of up to about 1.6 μm, a groove width of up to about 0.8 μm and a groove depth of up to about 700 Å. A silicon nitride dielectric layer 82 having a thickness of up to about 1000 Å is provided on the grooved side of polycarbonate substrate 81. A magneto-optic recording layer 83 formed, for example, of terbium-iron-cobalt (TbFeCo) or neodymium-dyprosium-iron-cobalt (NdDyFeCo) and having a thickness of 450 Å is formed on dielectric layer 82. A silicon nitride dielectric layer 84 having a thickness of 1000 Å is formed on magneto-optic recording layer 83. Substrate 81, dielectric layer 82, magneto-optic recording layer 83 and dielectric layer 84 form a first optical transmission substrate 88 having a recording surface.

A second optical transmission substrate 89 has a silicon nitride dielectric layer 86 having a thickness of 1000 Å on an ungrooved polycarbonate substrate 87. First optical transmission substrate 88 is adhered to second optical transmission substrate 89 through UV curing resin layer 85 so that dielectric layer 84 is adjacent one side of UV layer 85 and dielectric layer 86 is adjacent the opposite side. As can be seen in FIGS. 8B and 8C, each of dielectric layers 82, 84 and 86, magneto-optic recording layer 83 and UV curing resin adhesive layer 85 extend to the outside edges A' and B' of each of polycarbonate substrates 81 and 87.

In a more preferred embodiment, the dielectric layers and magneto-optic recording layers do not extend to the outside edges of the substrates. Instead, there is an area along each of the edges wherein the substrates are adhered only by the adhesive layer with no other layers between the substrates and/or the adhesive layer. The following examples show recording media having this structure.

EXAMPLE 6

Figure 9A:
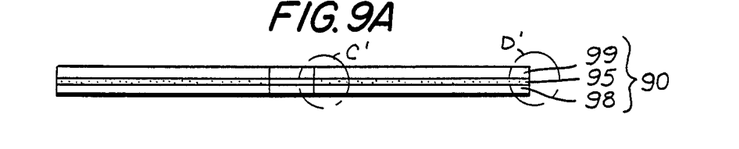
FIG. 9A is a cross-sectional view of an alternate embodiment of a optical recording disk constructed and arranged in accordance with the invention.
Figure 9B:
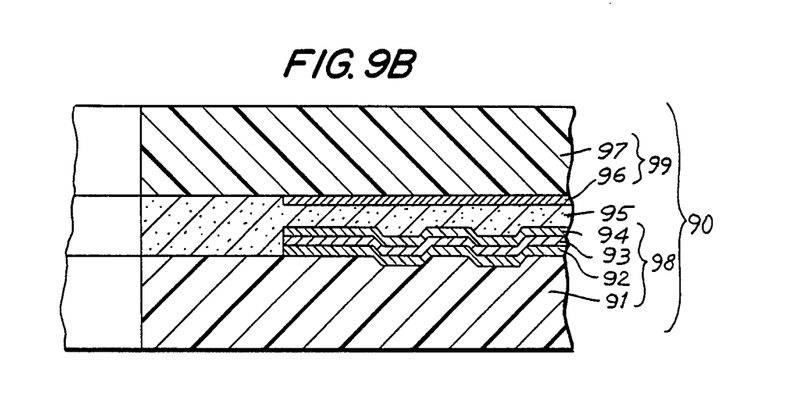
FIG. 9B is an exploded cross-sectional view of area C' of the disk of FIG. 9A.
Figure 9C:
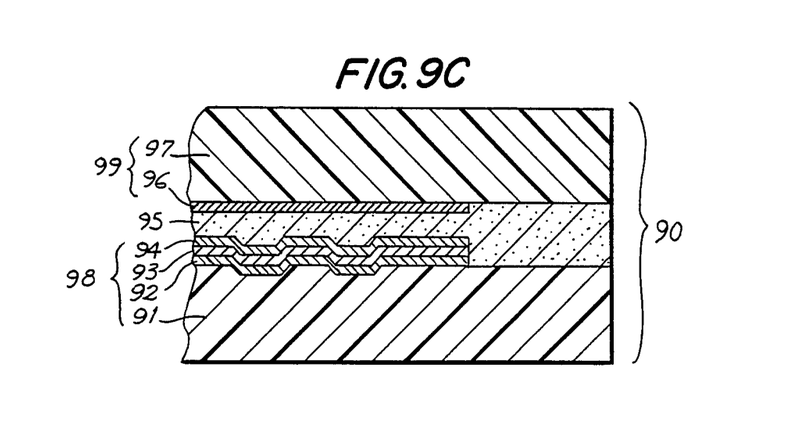
FIG. 9C is an exploded cross-sectional view of area D' of the disk of FIG. 9A.

FIGS. 9A to 9C show a disk-shaped recording media 90 constructed and arranged in accordance with the invention. One side of a polycarbonate substrate 91 having a thickness of 1.2 mm was grooved to a groove pitch of 1.6 μm, a groove width of 0.8 μm and groove depth of 700 Å. A mixed aluminum nitride/silicon nitride dielectric layer 92 having a thickness of 1000 Å was formed on the grooved side of substrate 91 but did not extend the entire distance to edges C' and D'. The dielectric layer was a mixture of 3 mol % aluminum nitride and 7 mol % silicon nitride. The percentage of aluminum nitride in the mixed aluminum nitride/silicon nitride dielectric layers in this and the following Examples can range between about 5 and 95 mol %. The reference to silicon nitride includes mixtures of SiN, $Si_3N_4$ and $SiN_x$ wherein x is an undetermined integer.

A neodymium-dysprosium-iron-cobalt (NdDyFeCo) magneto-optic recording layer 93 having a thickness of 450 Å was formed only on mixed aluminum nitride/silicon nitride dielectric layer 92. Then a mixed aluminum nitride/silicon nitride dielectric layer 94 having the same composition and a thickness of 1000 Å was formed on magneto-optic recording layer 93. Substrate 91, dielectric layer 92, magneto-optic recording layer 93 and dielectric layer 94 form a first optical transmission substrate 98.

An ungrooved polycarbonate substrate 97 having a thickness of 1.2 mm was provided and a mixed aluminum nitride/silicon nitride dielectric layer 96 having a thickness of 1000 Å was formed on one side of substrate 97 but did not extend the entire distance to edges C' and D'. Substrate 97 and dielectric layer 96 form a second optical transmission substrate 99. Substrates 98 and 99 were adhered together using an ultraviolet curing resin adhesive layer 95 of the type described in Example 1 in such a way that dielectric layers 94 and 96 were adjacent adhesive layer 95 on opposite sides thereof and polycarbonate substrates 91 and 97 were on the outside of the structure. Along the edges C' and D' of the structure, each of substrates 91 and 97 were directly adhered by ultraviolet curing resin adhesive layer 95. The length of this area along the edges of substrates 91 and 97 was about 2 mm both along edge C representing the internal area of a disk and edge D representing the circumferential area of a disk.

When the disk shown in FIGS. 9A to 9C was tested under high temperature, high humidity conditions (60° C., 90% relative humidity (RH)), the carrier to noise (C/N) ratio measured after 5000 hours was unchanged as compared with the C/N ratio measured before the test. The bit error rate increased by 0% after the test.

EXAMPLE 7

Figure 10A:
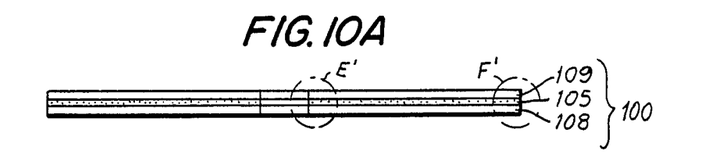
FIG. 10A is a cross-sectional view of a further alternate embodiment of a optical recording disk constructed and arranged in accordance with the invention.
Figure 10B:
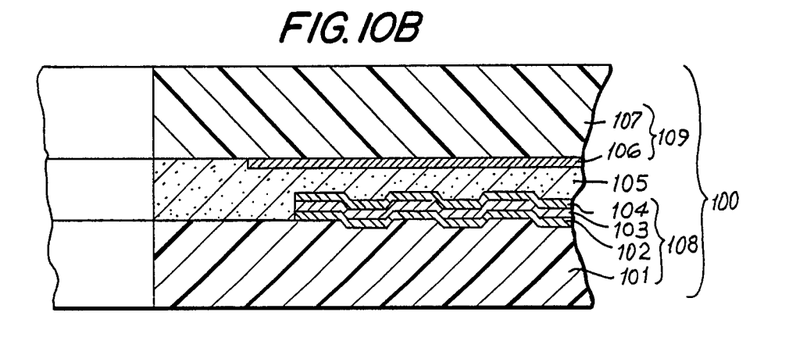
FIG. 10B is an exploded cross-sectional view of area E' of the disk of FIG. 10A.
Figure 10C:
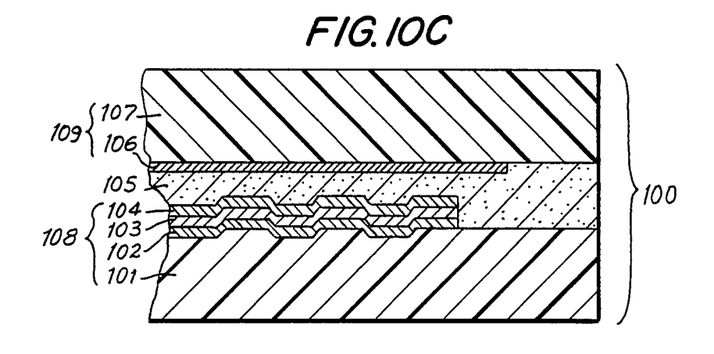
FIG. 10C is an exploded cross-sectional view of area F' of the disk of FIG. 10A.

FIGS. 10A to 10C show another alternate recording medium structure 100. A polycarbonate substrate 101 having a thickness of 1.2 mm and grooves having a groove pitch of 1.6 μm, a groove width of 0.8 μm and a groove depth of 700 Å was provided. A mixed aluminum nitride/silicon nitride dielectric layer 102 of the type described in Example 6 and having a thickness of 1000 Å was provided on the grooved side of polycarbonate substrate 101. A terbium-iron-cobalt (TbFeCo) magneto-optic recording layer 103 having a thickness of 450 Å was provided on dielectric layer 102. A second mixed aluminum nitride/silicon nitride dielectric layer 104 having a thickness of 1000 Å was provided on magneto-optic recording layer 103. Substrate 101, dielectric layer 102, magneto-optic recording layer 103 and dielectric layer 104 form a first optical transmission substrate 108.

An ungrooved polycarbonate substrate 107 having a thickness of 1.2 mm was provided and a mixed aluminum nitride/silicon nitride dielectric layer 106 having a thickness of 1000 Å was provided on polycarbonate substrate 107. Substrate 107 and dielectric layer 106 form a second optical transmission substrate 109. Substrates 108 and 109 were adhered together using an ultraviolet curing resin adhesive layer 105 of the type described in Example 1 so that dielectric layers 104 and 106 were adjacent adhesive 105 on opposite sides thereof and polycarbonate substrates 101 and 107 were on the outside of the structure. Substrates 101 and 107 were not provided with any layers along an internal area extending 1.0 mm from edge E' and along a circumferential area extending for the same distance along edge F'. Accordingly, the substrates were adhered together with only UV curing resin adhesive layer 105 therebetween along edges E' and F'. It is to be understood, however, that grooves in substrate 101 are provided even along the internal area, circumferential area and the portion where the polycarbonate substrate is exposed.

When this disk was tested for weatherability, the carrier to noise ratio measured after a 5000 hour test at 60° C. and 90% RH was unchanged as compared with the C/N ratio measured prior to the test. The bit error rate did not increase following the test.

EXAMPLE 8

Figure 11A:
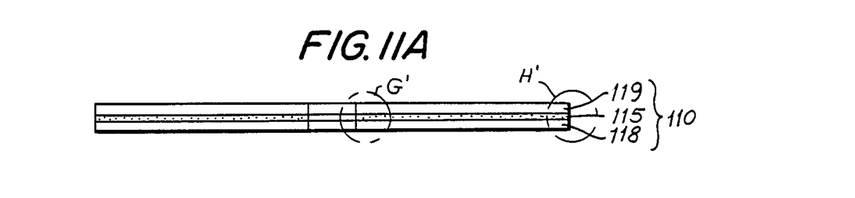
FIG. 11A is a cross-sectional view of yet another alternate embodiment of a optical recording disk constructed and arranged in accordance with the invention.
Figure 11B:
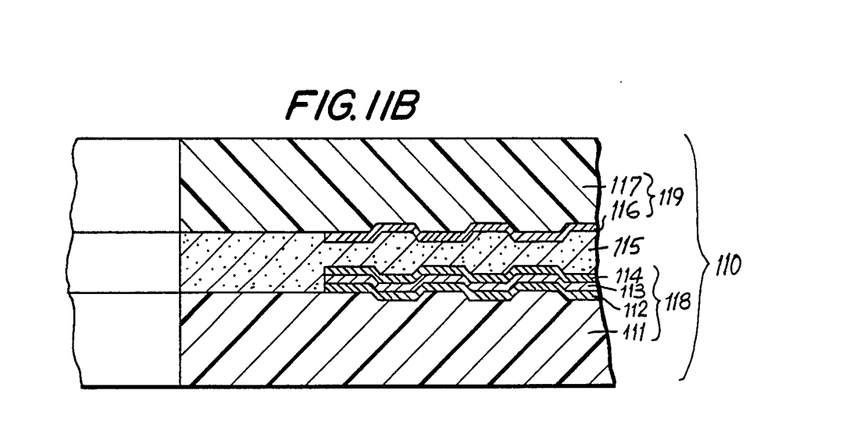
FIG. 11B is an exploded cross-sectional view of area G' of the disk of FIG. 11A.
Figure 11C:
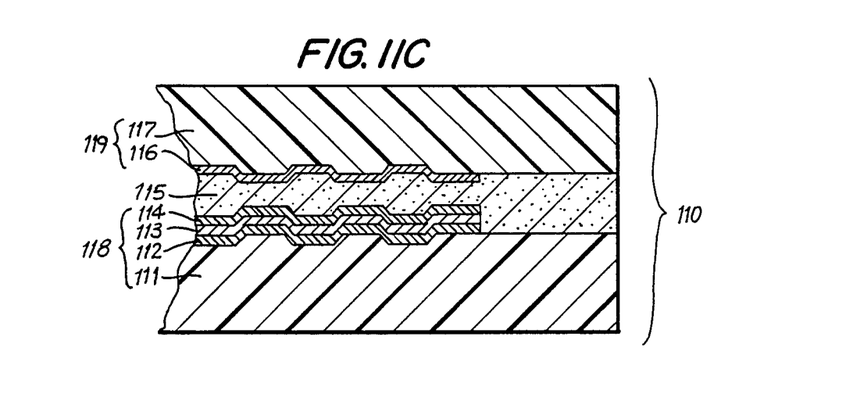
FIG. 11C is an exploded cross-sectional view of area H' of the disk of FIG. 11A.

Another structure 110 prepared in accordance with the invention is shown in FIGS. 11A to 11C. A polycarbonate substrate 111 having a thickness of 1.2 mm was grooved to a groove pitch of 1.6 μm, a groove width of 0.8 μm and a groove depth of 700 Å. A mixed aluminum nitride/silicon nitride dielectric layer 112 of the type described in Example 6 and having a thickness of 1000 Å was provided on the grooved side of polycarbonate substrate 111. Mixed aluminum nitride/silicon nitride dielectric layer 112 did not extend the entire distance to edges G' and H' of substrate 111. A neodymium-dysprosium-iron-cobalt (NdDyFeCo) magneto-optic recording layer 113 having a thickness of 450 Å was provided on mixed aluminum nitride/silicon nitride dielectric layer 112. A second mixed aluminum nitride/silicon nitride dielectric layer 114 having a thickness of 1000 Å was provided on magneto-optic recording layer 113. Substrate 111, dielectric layer 112, magneto-optic recording layer 113 and dielectric layer 114 form a first optical transmission substrate 118.

A polycarbonate substrate 117 having a thickness of 1.2 mm was also prepared with a groove. A mixed aluminum nitride/silicon nitride dielectric layer 116 having a thickness of 1000 Å was formed on the grooved side of polycarbonate substrate 117 but did not extend the entire distance to edges G' and H' of substrate 117. Mixed aluminum nitride/silicon nitride dielectric layer 116 exhibited improved adhesion due to the groove in second optical transmission substrate 119. Dielectric layer 116 and polycarbonate substrate 117 form a second optical transmission substrate 119. Optical transmission substrates 118 and 119 were adhered together using an ultraviolet curing resin adhesive layer 115 of the type described in Example 1. The internal area adjacent edge G' and circumferential area adjacent edge H' of the optical transmission substrates 118 and 119 were not covered with any layers and polycarbonate substrates 111 and 117 were adhered only with ultraviolet curing resin adhesive layer 115. The length of the exposure area was 5.0 mm in the internal area and 0.5 mm in the circumferential area.

When this disk was tested for weatherability, the carrier to noise ratio measured after 5000 hours at 60° C. and 90% RH was unchanged as compared with the C/N ratio measured prior to the test. The bit error rate did not increase following the test.

EXAMPLE 9

Figure 12:
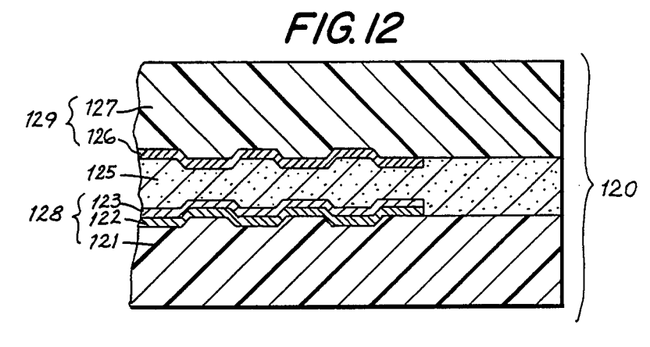
FIG. 12 is a cross-sectional view of another recording medium constructed and arranged in accordance with the invention.

FIG. 12 shows the circumferential area of a disk 120 prepared in accordance with the invention. A polycarbonate substrate 121 having a thickness of 1.2 mm was grooved to a groove pitch of 1.6 μm, a groove width of 0.8 μm and a groove depth of 700 Å. A mixed aluminum nitride/silicon nitride dielectric layer 122 of the type described in Example 6 and having a thickness of 1000 Å was formed on the grooved side of polycarbonate substrate 121. A neodymium-dysprosium-iron-cobalt (NdDyFeCo) magneto-optic recording layer 123 having a thickness of 450 Å was formed on dielectric layer 122. Substrate 121, dielectric layer 122 and magneto-optic recording layer 123 form a first optical transmission substrate 128.

A polycarbonate substrate 127 having a thickness of 1.2 mm was also grooved and a mixed aluminum nitride/silicon nitride dielectric layer 126 having a thickness of 1000 Å was provided on the grooved side of polycarbonate substrate 127. Substrate 127 and dielectric layer 126 form a second optical transmission substrate 129. Optical transmission substrates 128 and 129 were adhered together using an ultraviolet curing resin adhesive layer 125 of the type described in Example 1 in such a way that dielectric layer 126 and magneto-optic recording layer 123 were adjacent adhesive layer 125 on opposite sides thereof and polycarbonate substrates 121 and 127 were on the outside of the structure. The internal and circumferential area of the optical transmitted substrates 121 and 127 were not covered with any layer except for ultraviolet curing resin adhesive layer 125. The amount of exposure was 5.0 mm in the internal area and 0.5 mm in the circumferential area.

When this disk was tested for weatherability, the carrier to noise ratio measured after 1000 hours at 60° C. and 90% RH was unchanged as compared with the C/N ratio measured before the test. The bit error rate increased by 7% following the test.

EXAMPLE 10

Figure 13:
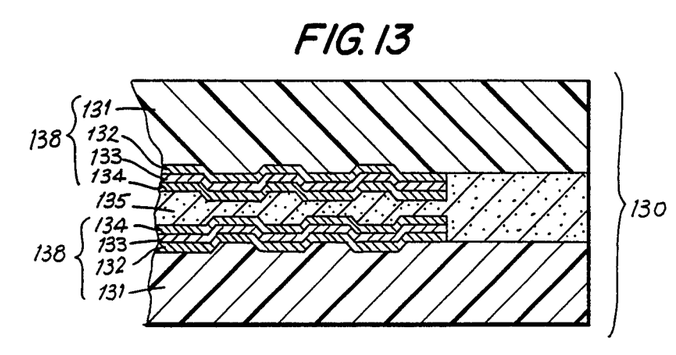
FIG. 13 is a cross-sectional view of still another alternate embodiment of a recording medium constructed and arranged in accordance with the invention.

A still further alternate embodiment of a disk 130 prepared in accordance with the invention is shown in FIG. 13. A polycarbonate substrate 131 having a thickness of 1.2 mm was grooved to a groove pitch of 1.6 $\mu$m, a groove width of 0.8 $\mu$m and a groove depth of 700 Å. A mixed aluminum nitride/silicon nitride dielectric layer 132 of the type described in Example 6 and having a thickness of 1000 Å was formed on the grooved side of polycarbonate substrate 131. A neodymium-dysprosium-iron-cobalt (NdDyFeCo) magneto-optic recording layer 133 having a thickness of 450 Å was formed on dielectric layer 132. A second mixed aluminum nitride/silicon nitride dielectric layer 134 having a thickness of 1000 Å was formed on magneto-optic recording layer 133. Substrate 131, dielectric layer 132, magneto-optic recording layer 133 and dielectric layer 134 form a first optical transmission substate 138.

Another optical transmission substrate 138 having the same configuration was also provided. The substrates were adhered together using an ultraviolet curing resin adhesive layer 135 of the type described in Example 1 in such a way that dielectric layers 134 were adjacent adhesive layer 135 on opposite sides thereof and substrates 131 were on the outside of the structure. The layers did not extend the entire distance to the edge of substrates 131 and the amount of substrate exposed was 5.0 mm in the internal area and 0.5 mm in the circumferential area. In the area of exposure, substrates 131 were adhered using only ultraviolet curing resin adhesive layer 135.

When this disk was tested for weatherability at 60° C. and 90% RH for 1000 hours, the carrier to noise ratio measured after the test was unchanged as compared with the C/N ratio measured prior to the test. The bit error rate did not increase after the test.

Although specific embodiments have been shown in the Examples, it is to be understood that other embodiments are also possible and fall within the scope of the invention. For example, the substrates can be formed of any thermoplastic or linear polymer such as polycarbonate, polymethylmethacrylate (PMMA) or the like which have superior optical properties. At least one substrate is transparent. Furthermore, cross-linked polymers such as epoxy resins or thermosetting resin substrates can be used in place of the polycarbonates shown in the Examples.

In addition to the silicon nitride ($Si_3N_4$ and $SiN$) shown in the Examples as transparent dielectric layers, at least one of the following can be used $Al_2O_3$, $Bi_2O_3$, $CaO$, $CdO$, $CdS$, $CeO_2$, $Cd_2O_3$, $In_2O_3$, $La_2O_3$, $MgF$, $MgO$, $Nd_2O_3$, $Sb_2O_3$, $SiO_2$, $SiO$, $SnO_2$, $TiO_2$, $ZnO$, $ZnO_2$, $ZnS$, $AlN$, $TiN$, $BN$, $HfN$ and $ZrN$. Either single or multilayer dielectric layers can be used as well as composite materials.

As for the recording layer, a phase transition type can be used instead of the terbium-iron-cobalt (TbFeCo) and neodymium-dysprosium-iron-cobalt (NdDyFeCo) layers shown in the examples. Finally, adhesives that are fluid before curing such as anerobic adhesives or two-part adhesives can be used in place of the UV curing adhesive that is cured by ultraviolet light.

As can be seen from this discussion, recording media prepared in accordance with the invention have no air bubbles in the adhesive layer when the substrates are formed together under vacuum. This is accomplished by providing an optical transmission substrate having at least one dielectric layer on a base in such a way that the dielectric layer is positioned adjacent to the adhesive.

One cause of air bubbles in the adhesive when substrates are adhered under vacuum without such a dielectric layer is that gas is generated by the optical transmission substrate. Another cause is that the adhesive has different wetting characteristics on the substrate surface. By providing a substrate with a dielectric layer, the generation of gas is prevented. Furthermore, the wetting characteristics of the adhesive become uniform and accordingly, no air bubbles are mixed with the adhesive layer.

Furthermore, by providing a substrate with a dielectric layer, the adhesive layer is not in contact with the optical transmission substrate. Therefore, the surface of the substrate is not attacked by monomers or oligomers in the adhesive. Attacks on the substrate by the adhesive cause light diffusion and have a detrimental effect on the optical properties of the recording media.

As has been shown, the structure of recording media of the invention prevents air from being mixed with the adhesive layer and greatly improves the bit error rate by removing burst error caused by air bubbles. It is necessary for the thickness of the dielectric layer to be between about 30 Å and 10 $\mu$m. When the thickness is less than about 30 Å the dielectric layer can only be scattered like islands on the substrate and is not provided uniformly. When the thickness is greater than about 10 $\mu$m, a great deal of time is required to cover the substrate and accordingly, this cannot be done economically.

In addition to the prevention of air bubbles in the adhesive layer, the mechanical strength of the media was greatly improved by providing recording media wherein the dielectric layers and magneto-optic recording layers do not extend to the edges of the media. Such media can withstand weatherability testing at 60° C. and 90% relative humidity. The carrier to noise ratio and bit error rate measured after 5000 hours of testing are relatively unchanged as compared with the C/N ratio and bit error rate measured before the test. Accordingly, reliability is remarkably improved over prior art structures.

The adhesive force of the optical transmission substrates and the adhesive layer in the exposed circumferential area and internal area of a disk is very strong as compared with the adhesive force of substrates having a dielectric material therebetween. Accordingly, the peeling of the adhered layer structures due to mechanical processes or durability testing is prevented. Finally, since the dielectric layer and recording layer are covered with adhesive, when the circumferential area or internal area is exposed to an external force, the recording layer remains undamaged.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A recording medium having only one magneto-optic recording layer, comprising:
    a first optical transmission substrate including a first base and at least a magneto-optic recording layer disposed on a portion of the first base;
    a second optical transmission substrate for cooperating with the first substrate including a second base and at least a dielectric layer disposed on the portion of the second substrate in the region overlapping the recording layer when assembled,
    wherein at least one of the first optical transmission substrate and the second optical transmission substrate is transparent; and
    an adhesive layer provided between the first and second optical transmission substrates so that the bases are distal from the adhesive layer on opposite sides thereof.

2. The recording medium of claim 1, wherein the dielectric layer of the second optical transmission substrate has a thickness between about 30 Å and 10μ.

3. The recording medium of claim 1, wherein the dielectric layer is selected from the group consisting of $Al_2O_3$, $Bi_2O_3$, CaO, CdO, Cds, $CeO_2$, $Cd_2O_3$, $In_2O_3$, $La_2O_3$, MgF, MgO, $Nd_2O_3$, $Sb_2O_3$, SiO, $SiO_2$, $SnO_2$, $TiO_2$, ZnO, $ZrO_2$, ZnS, AlN, $Si_3N_4$, SiN, TiN, BN, HfN, ZrN and mixtures thereof.

4. The recording medium of claim 1, wherein the first optical transmission substrate comprises a synthetic resin base formed with grooves on one side thereof, a dielectric layer disposed on the grooved side of the synthetic resin base and a magneto-optic recording medium disposed on the dielectric layer.

5. The recording medium of claim 4, wherein the grooved synthetic resin base is selected from the group consisting of polycarbonate substrates, polymethylmethacrylate substrates and polymethylpentene substrates.

6. The recording medium of claim 4, wherein the dielectric layer is selected from the group consisting of silicon nitride and silicon oxide and mixtures thereof.

7. The recording medium of claim 4, wherein the recording layer is selected from the group consisting of terbium-iron series and neodymium-dysprosium series.

8. The recording medium of claim 4, wherein the first optical transmission substrate further comprises a second dielectric layer on the magneto-optic recording layer.

9. The recording medium of claim 1, wherein the second optical transmission substrate comprises a synthetic resin substrate selected from the group consisting of polycarbonate substrates, polymethylmethacrylate substrates and polymethylpentene substrates having a dielectric layer disposed thereon.

10. The recording medium of claim 9, wherein the dielectric layer is selected from the group consisting of silicon nitride, silicon oxide, aluminum nitride, mixtures thereof and multilayers thereof.

11. The recording medium of claim 9, wherein the synthetic resin substrate is grooved on one side thereof and the dielectric layer is disposed on the grooved side of the synthetic resin substrate.

12. The recording medium of claim 1, wherein both the first and second optical transmission substrates are transparent.

13. The recording medium of claim 1, wherein the adhesive layer is an ultraviolet curing resin adhesive.

14. The recording medium of claim 13, wherein the ultraviolet curing resin adhesive includes an initiator and at least one acrylate monomer.

15. The recording medium of claim 14, wherein the ultraviolet curing resin adhesive is cured at an irradiation energy greater than about 100 mJ.

16. The recording medium of claim 1, wherein the magneto-optic recording layer does not extend to the edges of the first optical transmission substrate and the dielectric layer does not extend to the edges of the second optical transmission substrate and further wherein the adhesive layer does extend to the edges of both the first and second optical transmission substrates.

17. The recording medium of claim 1, wherein the recording medium is a disk.

18. A magneto-optic recroding medium having only one magneto-optic recording layer comprising:
    a first transparent substrate;
    a first dielectric layer formed on the first substrate;
    a magneto-optic recording layer on the first dielectric substrate;
    a second dielectric layer formed on the recording layer;
    an adhesive layer on the second dielectric layer;
    a third dielectric layer adjacent the adhesive layer; and
    a second transparent substrate adjacent to the third dielectric layer.

* * * * *